United States Patent
Yeo et al.

(10) Patent No.: US 12,500,734 B2
(45) Date of Patent: Dec. 16, 2025

(54) THIRD-PARTY PRIVATE SET DIFFERENCE

(71) Applicant: Seagate Technology LLC, Fremont, CA (US)

(72) Inventors: Foo Yee Yeo, Shugart (SG); Jason Hwei Ming Ying, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 50 days.

(21) Appl. No.: 18/665,419

(22) Filed: May 15, 2024

(65) Prior Publication Data

US 2025/0358096 A1 Nov. 20, 2025

(51) Int. Cl.
| | |
|---|---|
| *H04L 29/06* | (2006.01) |
| *H04L 9/00* | (2022.01) |
| *H04L 9/06* | (2006.01) |
| *H04L 9/14* | (2006.01) |

(52) U.S. Cl.
CPC ........... *H04L 9/008* (2013.01); *H04L 9/0637* (2013.01); *H04L 9/14* (2013.01)

(58) Field of Classification Search
CPC .......... H04L 9/008; H04L 9/0637; H04L 9/14
See application file for complete search history.

(56) References Cited

U.S. PATENT DOCUMENTS

| | | | | |
|---|---|---|---|---|
| 2015/0095389 | A1* | 4/2015 | Steele | G06F 9/46 |
| | | | | 708/250 |
| 2018/0060485 | A1 | 3/2018 | Huang et al. | |
| 2018/0359097 | A1* | 12/2018 | Lindell | H04L 9/3247 |
| 2020/0226480 | A1* | 7/2020 | Johnston | G06V 20/38 |
| 2023/0342669 | A1* | 10/2023 | Shao | H04L 9/008 |
| 2024/0330485 | A1* | 10/2024 | Yeo | G06F 21/602 |
| 2025/0254021 | A1* | 8/2025 | Lu | H04L 9/008 |
| 2025/0254022 | A1* | 8/2025 | Zhang | H04L 9/008 |

(Continued)

FOREIGN PATENT DOCUMENTS

CN 111540409 B 6/2023

OTHER PUBLICATIONS

Ghosh, Satrajit, et al., "The communication complexity of threshold private set intersection", Advances in Cryptology; CRYPTO 2019: 39th Annual International Cryptology Conference, Santa Barbara, CA, USA, Aug. 18-22, 2019, Proceedings, Part II; Springer-Verlag, 2019, 3-29.

(Continued)

*Primary Examiner* — Mahfuzur Rahman
(74) *Attorney, Agent, or Firm* — HOLZER PATEL DRENNAN

(57) ABSTRACT

A third party cryptographically determines a private set difference between a data set of a first party and a data set of a second party. The third party cryptographically generates a key pair including a private key and a public key, provides the public key to the first party and the second party, receives an encrypted result from the second party, wherein the encrypted result is computed prior to receipt by the third party using homomorphic operations performed using the public key, the data set of the first party, and the data set of the second party, decrypts the encrypted result using the private key to yield an intermediate data set, and determines the private set difference between the first data set and the second data set based on the intermediate data set.

20 Claims, 4 Drawing Sheets

(56) References Cited

U.S. PATENT DOCUMENTS

2025/0266983 A1\* 8/2025 Najarian ................ G06N 20/20

OTHER PUBLICATIONS

Huberman, Bernardo A., et al., "Enhancing privacy and trust in electronic communities", Proceedings of the 1999 ACM Conference on Electronic Commerce. ACM, 1999.

Meadows, Catherine, "A more efficient cryptographic matchmaking protocol for use in the absence of a continuously available third party", In Proceedings of the 1986 IEEE Symposium on Security and Privacy, 1986, 134-134.

Minsky, Y., et al., "Set reconciliation with nearly optimal communication complexity", IEEE Transactions on Information Theory; 49(9), 2003, 2213-2218.

Wang, Xiao Shaun, et al., "Efficient Genome-Wide, Privacy-Preserving Similar Patient Query based on Private Edit Distance", CCS 2015—Proceedings of the 22nd ACM SIGSAC Conference on Computer and Communications Security; Association for Computing Machinery, Oct. 12, 2015, 492-503.

Yeo, Foo Yee, et al., "Third-party private set intersection", 2023 IEEE International Symposium on Information Theory (ISIT), 2023, 1633-1638.

\* cited by examiner

THIRD-PARTY PRIVATE SET DIFFERENCE

SUMMARY

In some aspects, the techniques described herein relate to a computing-processor-implemented method of cryptographically determining a private set difference between a data set of a first party and a data set of a second party by a third party, the computing-processor-implemented method including: cryptographically generating, by the third party, a key pair including a private key and a public key; providing, by the third party, the public key to the first party and the second party; receiving, by the third party, an encrypted result from the second party, wherein the encrypted result is computed prior to receipt by the third party using homomorphic operations performed using the public key, the data set of the first party, and the data set of the second party; decrypting, by the third party, the encrypted result using the private key to yield an intermediate data set; and determining, by the third party, the private set difference between the first data set and the second data set based on the intermediate data set.

In some aspects, the techniques described herein relate to one or more tangible processor-readable storage media embodied with instructions for executing on one or more processors and circuits of a computing device a process for cryptographically determining a private set difference between a data set of a first party and a data set of a second party by a third party, the process including: cryptographically generating, by the third party, a key pair including a private key and a public key; providing, by the third party, the public key to the first party and the second party; receiving, by the third party, an encrypted result from the second party, wherein the encrypted result is computed prior to receipt by the third party using homomorphic operations performed using the public key, the data set of the first party, and the data set of the second party; decrypting, by the third party, the encrypted result using the private key to yield an intermediate data set; and determining, by the third party, the private set difference between the first data set and the second data set based on the intermediate data set.

In some aspects, the techniques described herein relate to a computing system as a third party for cryptographically determining a private set difference between a data set of a first party and a data set of a second party, the computing system including: one or more hardware computing processors; a cryptographic computation engine executable by the one or more hardware computing processors and configured to cryptographically generate a key pair including a private key and a public key, wherein the public key is provided to the first party and the second party; and a communication interface executable by the one or more hardware computing processors and configured to receive an encrypted result from the second party, the encrypted result is computed prior to receipt by the third party using homomorphic operations performed using the public key, the data set of the first party, and the data set of the second party, wherein the cryptographic computation engine is further configured to decrypt the encrypted result using the private key to yield an intermediate data set and to determine the private set difference between the first data set and the second data set based on the intermediate data set.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Private set difference (PSD) refers to a cryptographic primitive used for secure computation, which allows two or more parties to compute the difference between their sets while keeping their inputs secret. Given a party $P_1$ with a data set $S_1$ and another party $P_2$ with a data set $S_2$, respectively, a private set difference represents the problem of privately computing $S_1 \backslash S_2$ (the set of elements that lie in $S_1$ but not in $S_2$). Third-party private set difference (TP-PSD) refers to a model that enables the private computation of the difference of data sets held by two different parties, $P_1$ and $P_2$, while revealing the result only to an input-less third-party Q. The term "input-less" refers to a party that does not insert its own data into the difference computation.

Figure 1:
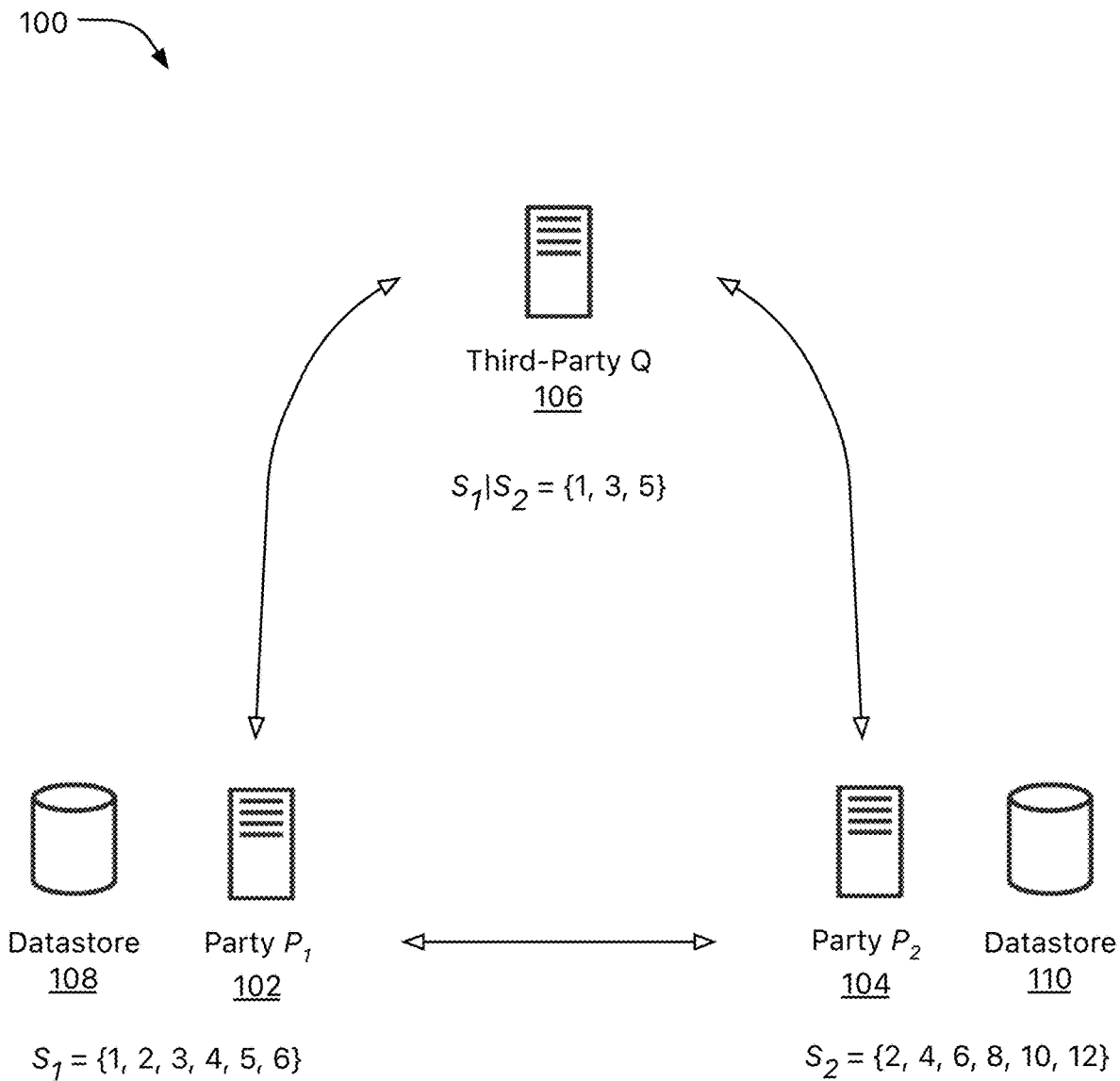
FIG. 1 illustrates an example architecture for computing TP-PSD involving two parties $P_1$ and $P_2$ and a third-party Q.

FIG. 1 illustrates an example architecture 100 for computing TP-PSD involving two parties, $P_1$ (party 102) and $P_2$ (party 104), and a third-party Q (party 106). Each party is represented by a hardware computing processor system, such as a server or other configuration of one or more computing devices. The party 102 stores a data set $S_1=\{1, 2, 3, 4, 5, 6\}$ in a datastore 108, and the party 104 stores a data set $S_2=\{2, 4, 6, 8, 10, 12\}$ in a datastore 110. The party 106 receives one or more encrypted results from the party 102 and/or the party 104 and computes the TP-PSD, which is represented by $S_1 \backslash S_2$ and equals the set $\{1, 3, 5\}$, the difference between $S_1$ and $S_2$.

The described TP-PSD technology can be applied to critical real-world applications, such as viral contact tracking within a population. During a pandemic, individuals may hold the location data of others who are within proximity for a certain period via contact tracing tokens. In the event an individual is known to be infected, the public health authority (PHA) may be tasked with notifying the close contacts of the infected individual of the risk of potential exposure. However, there is a time lapse between the onset of infection and diagnosis, especially for an asymptomatic individual. During this period, an asymptomatic individual might have come into contact with numerous people, many of whom might have already undergone testing during that time frame.

In this scenario, the PHA should only need to notify close contacts of the infected individual who have not undergone testing during the specified time frame. The benefits are two-fold. Firstly, this criterion greatly reduces the logistics of contact tracing by targeting only the relevant individuals who are unknowingly at risk of exposure. Secondly, this criterion provides privacy to each individual by not revealing the entire list of close contacts during a specified time frame apart from what is intended to be known to the PHA for contact tracing purposes.

In such settings, each individual assumes the role of $P_1$, while the entire list of close contacts in the relevant time frame corresponds to $S_1$. The testing centers assume the role of $P_2$, while the database of all individuals who have undergone testing during the same time frame corresponds to $S_1$. The PHA assumes the role of the third-party Q that does not input its own data into the TP-PSD computation. TP-PSD enables the PHA to achieve the required objective in a privacy-preserving manner without $P_1$, $P_2$, and itself (Q) learning any other information in the process.

In an alternative use case, an external party seeks to gather some data from an organization or cloud service provider on the status of computer components (e.g., storage drives) satisfying certain attributes. In this setting, the external party assumes the role of Q, the organization or cloud service provider assumes the role of $P_1$, and the computer component vendor assumes the role of $P_2$. For example, suppose the external party intends to gather data on the hard drives sold by the computer component vendor that maintain a high performance after a threshold number (n) of years. In this case, the status corresponds to "high performance," and the attribute corresponds to "age of hard drive." $S_1$ is the set of hard drives held by $P_1$ that are high performing while $S_2$ is the set of hard drives the vendor sold to $P_1$ within the past n years. The value of n is communicated only to $P_2$ by Q. The proposed protocols enable the third-party Q to obtain the required information in a privacy-preserving manner. That is, the full fleet of high-performing hard drives held by $P_1$ is not exposed to Q, the attribute for which Q seeks to gather data on is not exposed to $P_1$, while the eventual result is only known to Q and kept private from $P_1$ and $P_2$.

The described technology introduces two protocols to achieve third-party private set difference. The first protocol uses rational functions and an additively homomorphic encryption scheme, and the second protocol uses a somewhat leveled or fully homomorphic encryption scheme. While the first protocol is likely to be more efficient in practice for small to medium-sized data sets, the second protocol provides a better asymptotic complexity.

These protocols are the first to achieve the desired functionality of third-party PSD and are both secure and practical. Both protocols have close-to-optimal communication complexity. The first protocol has optimal (linear) computational complexity for both $P_1$ and $P_2$, with higher costs for Q. The second protocol has optimal computational complexity for both $P_1$ and Q, with higher costs for $P_2$. Furthermore, both protocols are quantum-safe if a quantum-safe homomorphic encryption scheme is used. The protocols are first introduced below, and then the computational flows of each protocol are described in more detail.

For various implementations of the first protocol, which uses rational functions, let $p_{s_1}(X)$ and $p_{s_2}(X)$ be the polynomials with roots given by the data sets $S_1$ and $S_2$, respectively. (The roots of a polynomial are the points at which the polynomial evaluates to 0.) A rational function is a function of the form $p(X)/q(X)$, where $p(X)$ and $q(X)$ are polynomials.

First, $P_1$ and $P_2$ choose random polynomials $r_1(X)$ and $r_2(X)$. Then, using an additively homomorphic encryption scheme, the random polynomials $r_1(X)$ and $r_2(X)$ provide Q with evaluations of the rational function:

$$f(X) = \frac{r_1(X)p_{s_1}(X) + r_2(X)p_{s_2}(X)}{p_{s_1}(X)}$$

at various $\alpha_i$'s representing points in a finite field $\mathbb{F} \setminus S$, where S denotes the image of $\{0,1\}^l$ under $\iota$. The respective data sets $S_1$ and $S_2$ are subsets of the finite field $\mathbb{F}$ of a given size defined by a parameter (l), and $\iota$ denotes an injective map ($\iota: \{0,1\}^l \hookrightarrow \mathbb{F}$). With these values, Q can then reconstruct the rational function $f(X)$ having a denominator with roots exactly at the elements of $S_1 \setminus S_2$.

To understand why this works, note that the numerator of $f(X)$, which is equal to $r_1(X)p_{s_1}(X)+r_2(X)p_{s_2}(X)$, behaves like a random polynomial with the constraint that it has roots at the elements of $S_1 \cap S_2$ (the intersection of $S_1$ and $S_2$). This observation is true because an element that lies in both $S_1$ and $S_2$ will result in $p_1(X)$ and $P_2(X)$ both evaluating to 0, and thus $r_1(X)p_{s_1}(X)+r_2(X)p_{s_2}(X)$ also evaluates to 0. Thus, elements of $S_1 \cap S_2$ are in both the numerator and the denominator of $f(X)$ and are "canceled out." On the other hand, elements of $S_1 \setminus S_2$ (denoting elements of $S_1$ that are not in $S_2$) appear in the denominator but do not appear in the numerator, and thus, each element remains a root of the denominator. As $r_1(X)p_{s_1}(X)+r_2(X)p_{s_2}(X)$ behaves like a random polynomial, no undesired leakage of information occurs so the data sets remain private.

The described technology introduces additional randomness to the evaluations of the polynomials defining the rational function so that the third-party Q does not learn any additional information about $S_1$ beyond the elements of $S_1 \setminus S_2$. Without this additional randomness, Q will be able to reconstruct the polynomial $p_{s_1}(X)$ and, hence, learn the entire set $S_1$, thereby defeating the desired privacy constraints. As such, the additional randomness assists in preserving privacy.

In various implementations, the first protocol has a quasi-linear communication complexity of $O(n \log n)$ and a computational complexity of $O(n^{\omega+o(1)})$, where $\omega$ is the exponent of matrix multiplication. The exponent of matrix multiplication $\omega$ is defined to be the least constant such that multiplication of two $n \times n$ matrices can be performed using $O(n^{\omega+o(1)})$ operations. In other words, its computational cost is comparable to the cost of multiplying two $n \times n$ matrices.

For various implementations of the second protocol, which uses fully homomorphic encryption, the basic idea behind is for $P_2$ to define a polynomial that evaluates to 0 at elements of $S_2$ and is the identity otherwise. $P_1$ encrypts the elements of its data set using an asymmetric homomorphic encryption scheme to yield encrypted elements and sends the encrypted elements to $P_2$ for homomorphic evaluation in the polynomial of $P_2$. The polynomial will evaluate to 0 at elements of $S_1$ that also lie in $S_2$ but evaluate to the input element otherwise, therefore indicating the difference between the two data sets. The still-encrypted evaluation results of the homomorphic evaluations are then sent to Q, which decrypts them using the private key to reveal the desired output. The fully homomorphic encryption scheme has circuit privacy so that the evaluated outputs do not leak any information about the inputs or the polynomial, and the data sets remain private.

In various implementations, the second protocol has a linear communication complexity of $O(n)$ and a computational complexity of $O(n^2)$. However, it is expected to be slower than the first protocol for most practical data set sizes due to the huge overheads coming from fully homomorphic encryption. Nevertheless, improvements in the performance of fully homomorphic encryption will directly translate into speed improvements in the second protocol.

Turning back to the first protocol, which uses rational functions, the following protocol details are provided. Let the size of each of $P_1$ and $P_2$'s data sets be n, and let $S_1=\{s_1, \ldots, s_n\} \subseteq \{0,1\}^l$ and $S_2=\{t_1, \ldots, t_n\} \subseteq \{0,1\}$r. Let $\lambda > 0$ be the correctness parameter. The set $\{0,1\}^l$ is embedded into a finite field $\mathbb{F}$ with $|\mathbb{F}| \geq \max(2^l+3n+1, 2^\lambda)$ using a map $\iota : \{0, 1\}^l \hookrightarrow \mathbb{F}$. Let S be the image of $\{0,1\}^l$ under $\iota$.

Fix $3n+1$ points $\alpha_1, \ldots, \alpha_{3n+1} \in \mathbb{F} \setminus S$, and let E: $\mathbb{F} \to \mathcal{C}$ be an asymmetric additively homomorphic encryption scheme. For any subset $T \cap \{0,1\}^l$, the polynomial $p_T(X) = \Pi_{t \in T}(X - \iota(t)) \in \mathbb{F}[X]$, where $p_T(X)$ represents a polynomial that evaluates to zero at elements of a data set T (e.g., $S_1$ or $S_2$). The following computational flow yields the desired TP-PSD result using the first protocol:

1. Q generates a key pair (sk, pk) for E and sends the public key pk to $P_1$ and $P_2$.
2. $P_1$ and $P_2$ pick $\beta_1, \ldots, \beta_{3n+1} \in \mathbb{F}$ uniformly at random.
3. $P_1$ chooses a random polynomial $r_1(X)$ of degree $\leq n$, computes $ct_{1,i}=E(pk, \beta_i r_1(\alpha_i) p_{s_1}(\alpha_i))$, and sends $ct_{1,i}$ to $P_2$ for $i \in [3n+1]$, where ct denotes ciphertext.
4. $P_2$ chooses a random polynomial $r_2(X)$ of degree $\leq n$ and computes $ct_{2,i}=E(pk, \beta_i r_2(\alpha_i) p_{s_2}(\alpha_i))$ for $i \in [3n+1]$.
5. For each $i \in [3n+1]$, $P_2$ performs homomorphic addition on $ct_{1,i}$ and $ct_{2,i}$ to obtain a ciphertext $ct_{0,i}$ and sends $ct_{0,i}$ to Q.
6. $P_1$ computes $d_i=\beta_i p_{s_1}(\alpha_i)$ and sends $d_i$ to Q, for $i \in [3n+1]$, wherein $d_i$ denotes elements of an intermediate data set corresponding to a denominator.
7. For each $i \in [3n+1]$, Q decrypts $ct_{0,i}$ using the private key sk to obtain $n_i$, wherein $n_i$ denotes elements in an intermediate data set corresponding to a numerator.
8. Q uses rational function interpolation to find the unique rational function $f(X)$ with a coprime polynomial numerator $q_1(X)$ of degree $\leq 2n$ and a coprime polynomial denominator $q_2(X)$ of degree $\leq n$, such that $f(\alpha_i)=n_i/d_i$ for $i \in [3n+1]$.
9. Let $f(X)=q_1(X)/q_2(X)$. Q computes $$\{\iota^{-1}(x):x \in \mathbb{F}, \text{ such that } q_2(x)=0\}$$

to output the private set difference.

Turning back to the second protocol, which uses fully homomorphic encryption, the following protocol details are provided. Let $S_1=\{s_1, \ldots, s_n\} \subseteq \{0,1\}^l$ and $S_2=\{t_1, \ldots, t_n\} \subseteq \{0,1\}^l$. Let $\mathbb{F}$ be a finite field with $q=|\mathbb{F}|>2^l$. Fix an injective map $\iota:\{0,1\}^l \hookrightarrow \mathbb{F}^*$, which identifies $\{0,1\}^l$ with $S \cap \mathbb{F}^*$. $\mathbb{F}^*$ denotes the non-zero elements of $\mathbb{F}$ (e.g., $\mathbb{F}^* = \mathbb{F} \setminus \{0\}$). Let E: $\mathbb{F} \to C$ be an asymmetric homomorphic encryption scheme with circuit privacy. The following computational flow yields the desired TP-PSD result using the second protocol:

1. Q generates a key pair (sk, pk) for E and sends the public key pk to $P_1$ and $P_2$.
2. $P_1$ computes $S_1'=E(pk, \iota(s_i))$ for $i \in [n]$ to encrypt its data set and sends the encrypted $S_1'$ to $P_2$.
3. $P_2$ homomorphically evaluates the polynomial $$p(X)=X(X-\iota(t_1))^{q-1} \cdots (X-\iota(t_n))^{q-1}$$

at all elements of $S_1'$, where the elements of $S_2$ are denoted as $t_i$, and sends the encrypted result of the evaluated polynomial to Q.

4. Q decrypts the encrypted results using the private key sk to obtain an intermediate data set R.
5. Q computes $\{\iota^{-1}(r):r \in R \setminus \{0\}\}$ to output the private set difference based on a membership computation performed on the intermediate data set R. The notation indicates that Q computes to output non-zero elements of R.

The scheme is correct because $$p(\iota(s_i)) = \begin{cases} 0 & \text{if } s_i = t_j \text{ for some } j, \\ \iota(s_i) & \text{if } s_i \neq t_j \text{ for all } j. \end{cases}$$

The latter holds because elements of $\mathbb{F}^*$ have multiplicative order dividing q−1. Note that circuit privacy causes the final encrypted results to not reveal any information about the polynomial p(X) and hence the elements in $S_2$.

Figure 2:
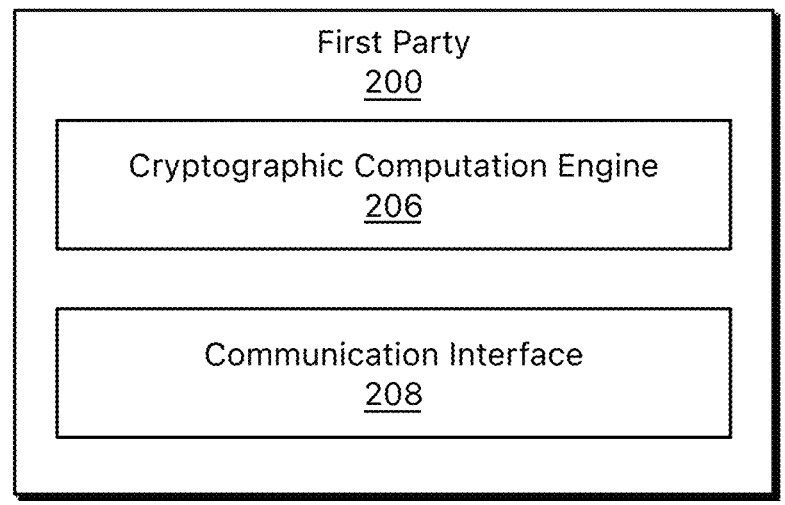
FIG. 2 illustrates example systems for a first party having a first data set, a second party having a second data set, and a third party configured to compute the private set difference between the first data set and the second data set.
Figure 2:
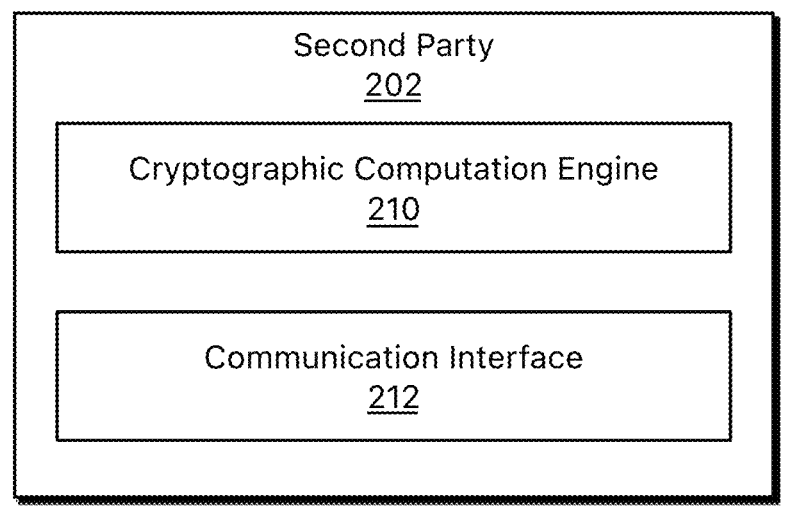
Figure 2:
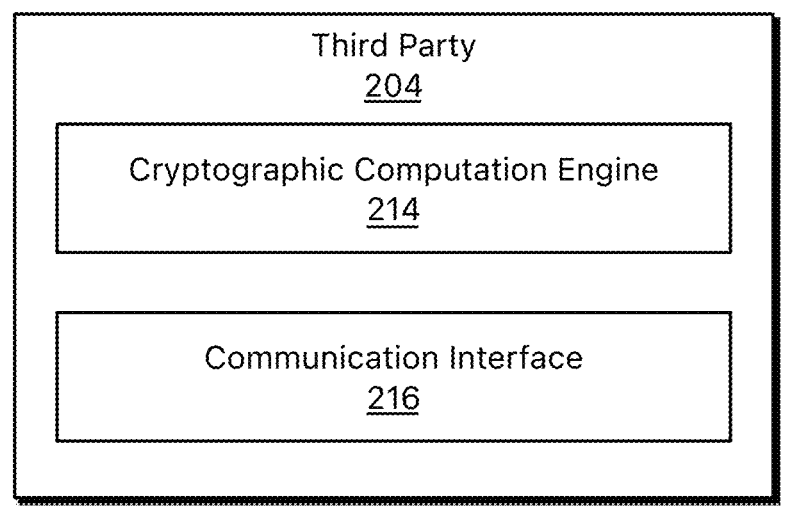

FIG. 2 illustrates example systems for a first party 200 having a first data set, a second party 202 having a second data set, and a third party 204 configured to compute the private set difference between the first data set and the second data set. Let E: $\mathbb{F} \to \mathcal{C}$ be an asymmetric homomorphic encryption scheme with circuit privacy.

The first party 200 includes a cryptographic computation engine 206 and a communication interface 208. For the first protocol, the cryptographic computation engine 206 is configured to pick $\beta_1, \ldots, \beta_{3n+1} \in \mathbb{F}$ uniformly at random, choose a random polynomial $r_1(X)$ of degree $\leq n$ and compute $ct_{1,i}=E(pk, \beta_i r_1(\alpha_i) p_{s_1}(\alpha_i))$, where 3n+1 points are fixed as $\alpha_1, \ldots, \alpha_{3n+1} \in \mathbb{F} \setminus S$ and E:$\mathbb{F} \to C$ is an asymmetric additively homomorphic encryption scheme. Both the first party 200 and the second party 202 use the same values of $\beta_1, \ldots, \beta_{3n+1} \in \mathbb{F}$. Examples of how these values are coordinated between the first party 200 and the second party 202 are described below. For any subset $T \cap \{0,1\}^l$, the polynomial $p_T(X)=\Pi_{t \in T}(X - \iota(t)) \in \mathbb{F}[X]$, where $p_T(X)$ represents a polynomial that evaluates to zero at elements of a data set T (e.g., $S_1$ or $S_2$). The cryptographic computation engine 206 is also configured to compute $d_i=\beta_i p_{s_1}(\alpha_i)$. The communication interface 208 is configured to receive a public key pk from the third party 204, send $ct_{1,i}$ to the second party 202 for $i \in [3n+1]$, where ct denotes ciphertext, and send $d_i$ to the third party 204, for $i \in [3n+1]$, wherein $d_i$ denotes elements of an intermediate data set corresponding to a denominator.

For the second protocol, the cryptographic computation engine 206 is configured to compute $S_1'=E(pk, \iota(s_i))$ for $i \in [n]$ to generate an encrypted version of its data set $S_1$. The communication interface 208 is configured to receive a public key pk from the third party 204 and send the encrypted $S_1'$ to the second party.

The second party 202 includes a cryptographic computation engine 210 and a communication interface 212. For the first protocol, the cryptographic computation engine 210 is configured to pick $\beta_1, \ldots, \beta_{3n+1} \in \mathbb{F}$ uniformly at random, choose a random polynomial $r_2(X)$ of degree $\leq n$ and computes $ct_{2,i}=E(pk, \beta_i r_2(\alpha_i) p_{s_2}(\alpha_i))$ for $i \in [3n+1]$, and, for each $i \in [3n+1]$, perform homomorphic addition on $ct_{1,i}$ and $ct_{2,i}$ to obtain a ciphertext $ct_{0,i}$. Both the first party 200 and the second party 202 use the same values of $\beta_1, \ldots, \beta_{3n+1} \in \mathbb{F}$. Accordingly, in some implementations, the second party 202 selects the $\beta_1, \ldots, \beta_{3n+1} \in \mathbb{F}$ and sends them to the first party 200 via the communication interface 212. If the first party 200 selects the $\beta_1, \ldots, \beta_{3n+1} \in \mathbb{F}$, then the first party 200 sends the selected $\beta_1, \ldots, \beta_{3n+1} \in \mathbb{F}$ to the second party 202, which receives them via the communication interface 212. The communication interface 212 is also configured to receive the public key pk from the third party 204, receive $S_1'$ from the first party 200, and send ciphertext $ct_{0,i}$ to the third party 204.

For the second protocol, the cryptographic computation engine 210 is configured to homomorphically evaluate the polynomial $$p(X)=X(X-\ell(t_1))^{q-1} \ldots (X-\ell_n))^{q-1}$$

at all elements of $S_1'$, where the elements of $S_2$ are denoted as $t_i$. The communication interface 212 is configured to send the encrypted results of the evaluated polynomial to the third party 204.

The third party 204 includes a cryptographic computation engine 214 and a communication interface 216. For both protocols, the cryptographic computation engine 214 is configured to generate a key pair (sk, pk) for E. For the first protocol, the communication interface 216 is configured to send the public key pk to the first party 200 and the second party 202 and receive ciphertext $ct_{0,i}$ from the second party 202. the cryptographic computation engine 214 is configured to decrypt $ct_{0,i}$, or each i∈[3n+1], using the private key sk to obtain $n_i$, wherein $n_i$ denotes elements in an intermediate data set corresponding to a numerator, use rational function interpolation to find the unique rational function $f(X)$ with a coprime polynomial numerator $q_1(X)$ of degree ≤2n and a coprime polynomial denominator $q_2(X)$ of degree ≤n, such that $f(\alpha_i)=n_i/d_i$(a ratio) for i∈[3n+1], and compute $$\{\ell^{-1}(x):x\in\mathbb{F}\text{,such that } q_2(x)=0\}$$

to output the private set difference.

Figure 3:
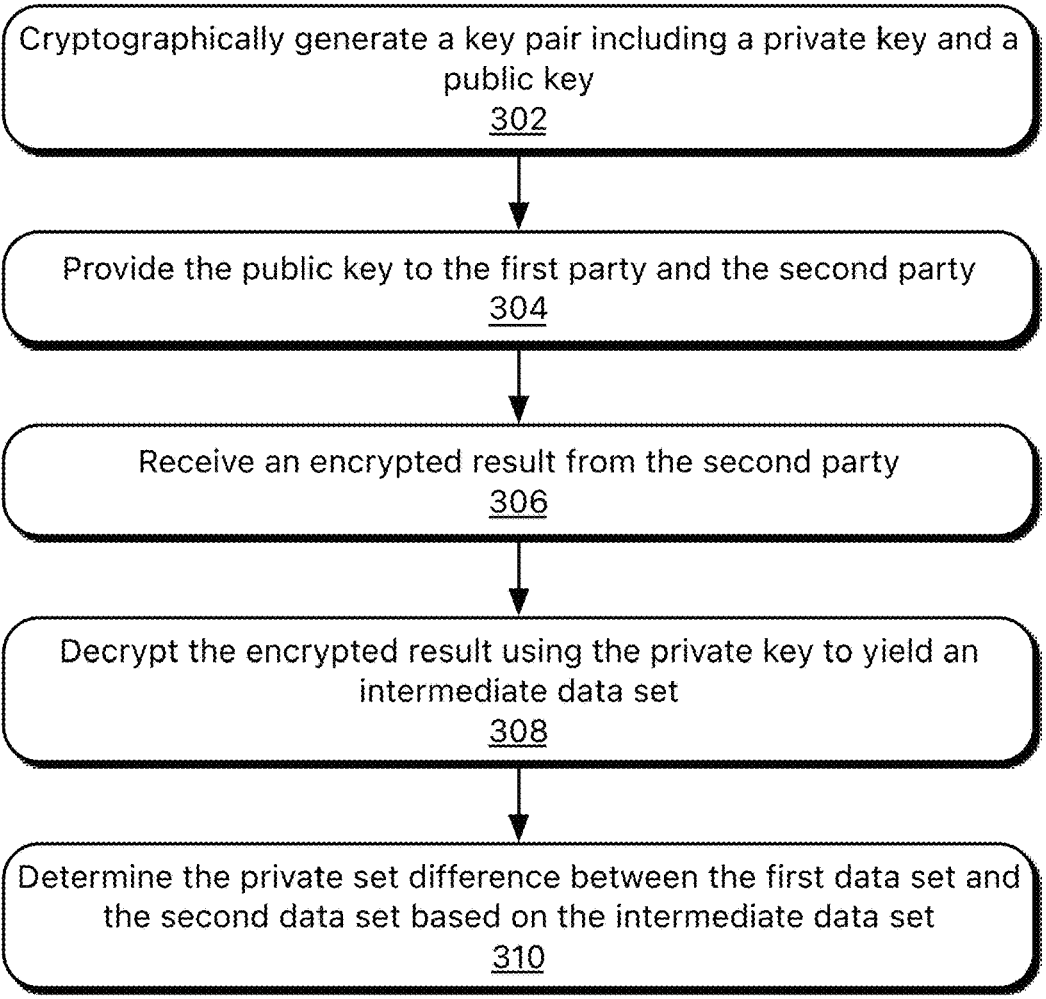
FIG. 3 illustrates example operations for computing a third-party private set difference using either protocol.

FIG. 3 illustrates example operations 300 for computing a third-party private set difference using either protocol. The computer-implemented method shown in FIG. 2 is performed by a third party to cryptographically determine a private set difference between a data set of a first party and a data set of a second party by the third party. A key generation operation 302 cryptographically generates a key pair that includes a private key and a public key. A communication operation 304 provides the public key to the first party and the second party.

Another communication operation 306 receives an encrypted result from the second party, wherein the encrypted result is computed prior to receipt by the third party using homomorphic operations performed using the public key, the data set of the first party, and the data set of the second party. A decrypting operation 308 decrypts the encrypted result using the private key to yield an intermediate data set. A result operation 310 determines the private set difference between the first data set and the second data set based on the intermediate data set.

Figure 4:
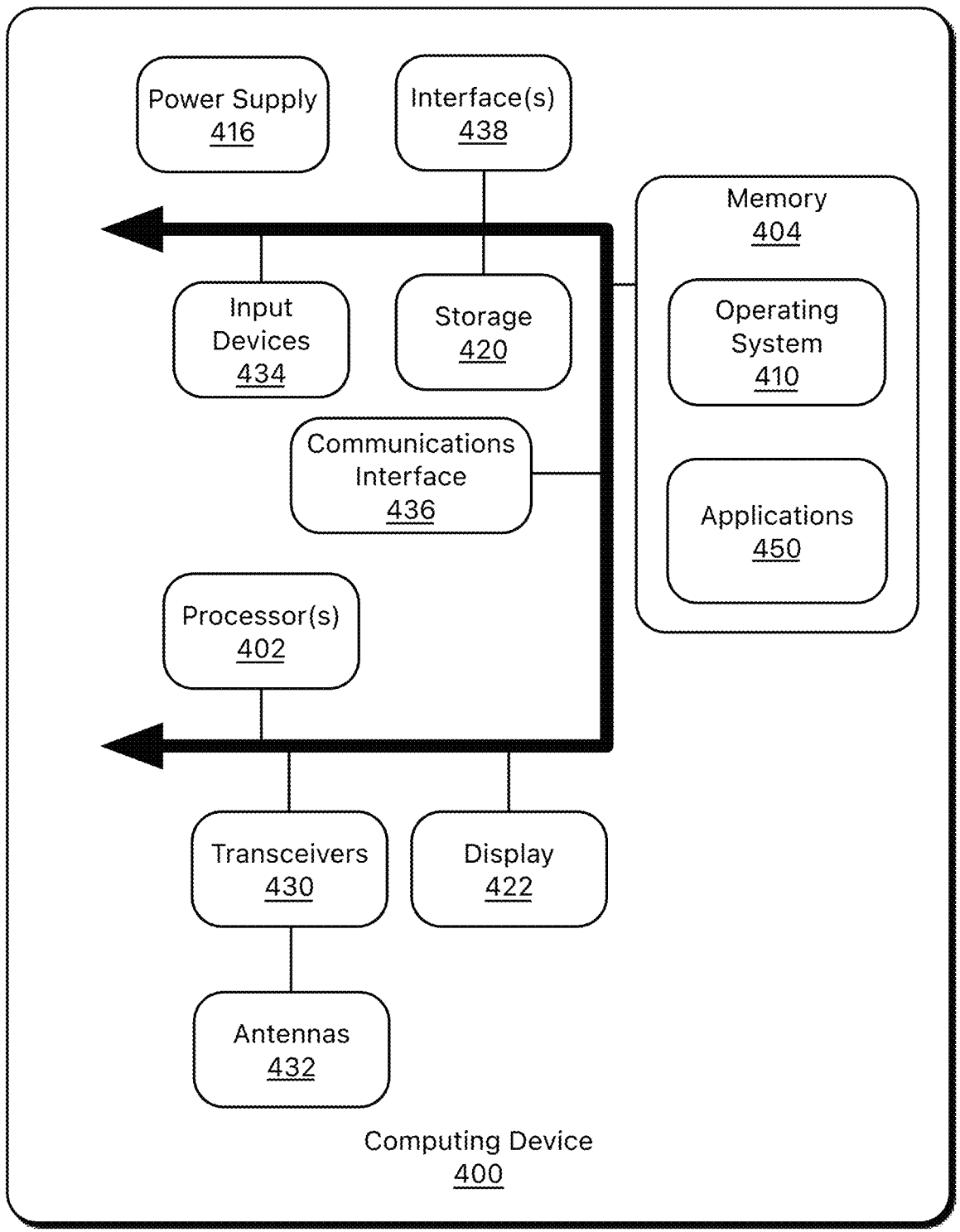
FIG. 4 illustrates an example computing device for use in implementing the described technology.

FIG. 4 illustrates an example computing device 400 for use in implementing the described technology. The computing device 400 may be a client computing device (such as a laptop computer, a desktop computer, or a tablet computer), a server/cloud computing device, an Internet-of-Things (IoT), any other type of computing device, or a combination of these options. The computing device 400 includes one or more hardware processor(s) 402 and a memory 404. The memory 404 generally includes both volatile memory (e.g., RAM) and nonvolatile memory (e.g., flash memory), although one or the other type of memory may be omitted. An operating system 410 resides in the memory 404 and is executed by the processor(s) 402. In some implementations, the computing device 400 includes and/or is communicatively coupled to storage 420.

In the example computing device 400, as shown in FIG. 4, one or more software modules, segments, and/or processors, such as applications 450, a cryptographic computation engine, a communication interface, and other program code and modules are loaded into the operating system 410 on the memory 404 and/or the storage 420 and executed by the processor(s) 402. The storage 420 may store public and private cryptographic keys, data sets, and other data and be local to the computing device 400 or may be remote and communicatively connected to the computing device 400. In particular, in one implementation, components of a system for cryptographically determining a private set difference between a data set of a first party and a data set of a second party by a third party may be implemented entirely in hardware or in a combination of hardware circuitry and software.

The computing device 400 includes a power supply 416, which may include or be connected to one or more batteries or other power sources, and which provides power to other components of the computing device 400. The power supply 416 may also be connected to an external power source that overrides or recharges the built-in batteries or other power sources.

The computing device 400 may include one or more communication transceivers 430, which may be connected to one or more antenna(s) 432 to provide network connectivity (e.g., mobile phone network, Wi-Fi®, Bluetooth®) to one or more other servers, client devices, IoT devices, and other computing and communications devices. The computing device 400 may further include a communications interface 436 (such as a network adapter or an I/O port, which are types of communication devices). The computing device 400 may use the adapter and any other types of communication devices for establishing connections over a wide-area network (WAN) or local-area network (LAN). It should be appreciated that the network connections shown are exemplary and that other communications devices and means for establishing a communications link between the computing device 400 and other devices may be used.

The computing device 400 may include one or more input devices 434 such that a user may enter commands and information (e.g., a keyboard, trackpad, or mouse). These and other input devices may be coupled to the server by one or more interfaces 438, such as a serial port interface, parallel port, or universal serial bus (USB). The computing device 400 may further include a display 422, such as a touchscreen display.

The computing device 400 may include a variety of tangible processor-readable storage media and intangible processor-readable communication signals. Tangible processor-readable storage can be embodied by any available media that can be accessed by the computing device 400 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 400. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A computing-processor-implemented method of cryptographically determining a private set difference between a data set of a first party and a data set of a second party by a third party, the computing-processor-implemented method comprising: cryptographically generating, by the third party, a key pair including a private key and a public key; providing, by the third party, the public key to the first party and the second party; receiving, by the third party, an encrypted result from the second party, wherein the encrypted result is computed prior to receipt by the third party using homomorphic operations performed using the public key, the data set of the first party, and the data set of the second party; decrypting, by the third party, the encrypted result using the private key to yield an intermediate data set; and determining, by the third party, the private set difference between the first data set and the second data set based on the intermediate data set.

Clause 2. The computing-processor-implemented method of clause 1, wherein the encrypted result received by the third party from the second party includes ciphertext generated using homomorphic addition by the second party on a first ciphertext component generated by the first party for the first data set and a second ciphertext component generated by the second party for the second data set.

Clause 3. The computing-processor-implemented method of clause 2, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

Clause 4. The computing-processor-implemented method of clause 1, wherein the intermediate data set is a first intermediate data set corresponding to a numerator and determining the private set difference comprises: receiving, from the first party, a second intermediate data set corresponding to a denominator computed by the first party; finding a unique rational function using rational function interpolation based on a ratio of the first intermediate data set to the second intermediate data set; determining a coprime polynomial numerator and a coprime polynomial denominator based on the unique rational function; and computing the private set difference based on elements of the first data set and the second data set that result in the coprime polynomial denominator equaling zero.

Clause 5. The computing-processor-implemented method of clause 1, wherein the encrypted result is homomorphically evaluated from a polynomial for all elements of an encrypted data set by the second party, wherein the encrypted data set is generated by the first party from an asymmetrical homomorphic encryption performed by the first party on the data set of the first party.

Clause 6. The computing-processor-implemented method of clause 5, wherein the polynomial evaluates to zero for elements of the second data set and to identities of elements that are not elements of the second data set.

Clause 7. The computing-processor-implemented method of clause 1, wherein determining comprises: computing the private set difference from a membership computation performed on the intermediate data set to output non-zero elements of the intermediate data set.

Clause 8. One or more tangible processor-readable storage media embodied with instructions for executing on one or more processors and circuits of a computing device a process for cryptographically determining a private set difference between a data set of a first party and a data set of a second party by a third party, the process comprising: cryptographically generating, by the third party, a key pair including a private key and a public key; providing, by the third party, the public key to the first party and the second party; receiving, by the third party, an encrypted result from the second party, wherein the encrypted result is computed prior to receipt by the third party using homomorphic operations performed using the public key, the data set of the first party, and the data set of the second party; decrypting, by the third party, the encrypted result using the private key to yield an intermediate data set; and determining, by the third party, the private set difference between the first data set and the second data set based on the intermediate data set.

Clause 9. The one or more tangible processor-readable storage media of clause 8, wherein the encrypted result received by the third party from the second party includes ciphertext generated using homomorphic addition by the second party on a first ciphertext component generated by the first party for the first data set and a second ciphertext component generated by the second party for the second data set.

Clause 10. The one or more tangible processor-readable storage media of clause 9, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

Clause 11. The one or more tangible processor-readable storage media of clause 8, wherein the intermediate data set is a first intermediate data set corresponding to a numerator and determining the private set difference comprises: receiving, from the first party, a second intermediate data set corresponding to a denominator computed by the first party; finding a unique rational function using rational function interpolation based on a ratio of the first intermediate data set to the second intermediate data set; determining a coprime polynomial numerator and a coprime polynomial denominator based on the unique rational function; and computing the private set difference based on elements of the first data set and the second data set that result in the coprime polynomial denominator equaling zero.

Clause 12. The one or more tangible processor-readable storage media of clause 8, wherein the encrypted result is homomorphically evaluated by the second party from a polynomial determined from an asymmetrical homomorphic encryption performed by the first party on the data set of the first party.

Clause 13. The one or more tangible processor-readable storage media of clause 12, wherein the polynomial evaluates to zero for elements of the second data set and to identities of elements that are not elements of the second data set.

Clause 14. The one or more tangible processor-readable storage media of clause 8, wherein determining comprises: computing the private set difference from a membership computation performed on the intermediate data set to output non-zero elements of the intermediate data set.

Clause 15. A computing system as a third party for cryptographically determining a private set difference between a data set of a first party and a data set of a second party, the computing system comprising: one or more hardware computing processors; a cryptographic computation engine executable by the one or more hardware computing processors and configured to cryptographically generate a key pair including a private key and a public key, wherein the public key is provided to the first party and the second party; and a communication interface executable by the one or more hardware computing processors and configured to receive an encrypted result from the second party, the encrypted result is computed prior to receipt by the third party using homomorphic operations performed using the public key, the data set of the first party, and the data set of the second party, wherein the cryptographic computation engine is further configured to decrypt the encrypted result using the private key to yield an intermediate data set and to determine the private set difference between the first data set and the second data set based on the intermediate data set.

Clause 16. The computing system of clause 15, wherein the encrypted result received by the third party from the second party includes ciphertext generated using homomorphic addition by the second party on a first ciphertext component generated by the first party for the first data set and a second ciphertext component generated by the second party for the second data set.

Clause 17. The computing system of clause 16, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

Clause 18. The computing system of clause 15, wherein the intermediate data set is a first intermediate data set corresponding to a numerator and the cryptographic computation engine is further configured to determine the private set difference by receiving, from the first party, a second intermediate data set corresponding to a denominator computed by the first party, finding a unique rational function using rational function interpolation based on a ratio of the first intermediate data set to the second intermediate data set, determining a coprime polynomial numerator and a coprime polynomial denominator based on the unique rational function, and computing the private set difference based on elements of the first data set and the second data set that result in the coprime polynomial denominator equaling zero.

Clause 19. The computing system of clause 15, wherein the encrypted result is homomorphically evaluated from a polynomial for all elements of an encrypted data set by the second party, wherein the encrypted data set is generated by the first party from an asymmetrical homomorphic encryption performed by the first party on the data set of the first party.

Clause 20. The computing system of clause 19, wherein the polynomial evaluates to zero for elements of the second data set and to identities of elements that are not elements of the second data set.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing-processor-implemented method of cryptographically determining a private set difference between a data set of a first party and a data set of a second party by a third party, the computing-processor-implemented method comprising:

cryptographically generating, by the third party, a key pair including a private key and a public key;

providing, by the third party, the public key to the first party and the second party;

receiving, by the third party, an encrypted result from the second party, wherein the encrypted result is computed prior to receipt by the third party using homomorphic operations performed using the public key, the data set of the first party, and the data set of the second party;

decrypting, by the third party, the encrypted result using the private key to yield an intermediate data set; and determining, by the third party, the private set difference between the first data set and the second data set based on the intermediate data set.

2. The computing-processor-implemented method of claim 1, wherein the encrypted result received by the third party from the second party includes ciphertext generated using homomorphic addition by the second party on a first ciphertext component generated by the first party for the first data set and a second ciphertext component generated by the second party for the second data set.

3. The computing-processor-implemented method of claim 2, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

4. The computing-processor-implemented method of claim 1, wherein the intermediate data set is a first intermediate data set corresponding to a numerator and determining the private set difference comprises:

receiving, from the first party, a second intermediate data set corresponding to a denominator computed by the first party;

finding a unique rational function using rational function interpolation based on a ratio of the first intermediate data set to the second intermediate data set;

determining a coprime polynomial numerator and a coprime polynomial denominator based on the unique rational function; and computing the private set difference based on elements of the first data set and the second data set that result in the coprime polynomial denominator equaling zero.

5. The computing-processor-implemented method of claim 1, wherein the encrypted result is homomorphically evaluated from a polynomial for all elements of an encrypted data set by the second party, wherein the encrypted data set is generated by the first party from an asymmetrical homomorphic encryption performed by the first party on the data set of the first party.

6. The computing-processor-implemented method of claim 5, wherein the polynomial evaluates to zero for elements of the second data set and to identities of elements that are not elements of the second data set.

7. The computing-processor-implemented method of claim 1, wherein determining comprises:

computing the private set difference from a membership computation performed on the intermediate data set to output non-zero elements of the intermediate data set.

8. One or more non-tangible processor-readable storage media embodied with instructions for executing on one or more processors and circuits of a computing device a process for cryptographically determining a private set difference between a data set of a first party and a data set of a second party by a third party, the process comprising: cryptographically generating, by the third party, a key pair including a private key and a public key; providing, by the third party, the public key to the first party and the second party; receiving, by the third party, an encrypted result from the second party, wherein the encrypted result is computed prior to receipt by the third party using homomorphic operations performed using the public key, the data set of the first party, and the data set of the second party; decrypting, by the third party, the encrypted result using the private key to yield an intermediate data set; and determining, by the third party, the private set difference between the first data set and the second data set based on the intermediate data set.

9. The one or more non-tangible processor-readable storage media of claim 8, wherein the encrypted result received by the third party from the second party includes ciphertext generated using homomorphic addition by the second party on a first ciphertext component generated by the first party for the first data set and a second ciphertext component generated by the second party for the second data set.

10. The one or more non-tangible processor-readable storage media of claim 9, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

11. The one or more non-tangible processor-readable storage media of claim 8, wherein the intermediate data set is a first intermediate data set corresponding to a numerator and determining the private set difference comprises: receiving, from the first party, a second intermediate data set corresponding to a denominator computed by the first party; finding a unique rational function using rational function interpolation based on a ratio of the first intermediate data set to the second intermediate data set; determining a coprime polynomial numerator and a coprime polynomial denominator based on the unique rational function; and computing the private set difference based on elements of the first data set and the second data set that result in the coprime polynomial denominator equaling zero.

12. The one or more non-tangible processor-readable storage media of claim 8, wherein the encrypted result is homomorphically evaluated by the second party from a polynomial determined from an asymmetrical homomorphic encryption performed by the first party on the data set of the first party.

13. The one or more non-tangible processor-readable storage media of claim 12, wherein the polynomial evaluates to zero for elements of the second data set and to identities of elements that are not elements of the second data set.

14. The one or more non-tangible processor-readable storage media of claim 8, wherein determining comprises: computing the private set difference from a membership computation performed on the intermediate data set to output non-zero elements of the intermediate data set.

15. A computing system as a third party for cryptographically determining a private set difference between a data set of a first party and a data set of a second party, the computing system comprising:

one or more hardware computing processors;

a cryptographic computation engine executable by the one or more hardware computing processors and configured to cryptographically generate a key pair including a private key and a public key, wherein the public key is provided to the first party and the second party; and a communication interface executable by the one or more hardware computing processors and configured to receive an encrypted result from the second party, the encrypted result is computed prior to receipt by the third party using homomorphic operations performed using the public key, the data set of the first party, and the data set of the second party,
wherein the cryptographic computation engine is further configured to decrypt the encrypted result using the private key to yield an intermediate data set and to determine the private set difference between the first data set and the second data set based on the intermediate data set.

16. The computing system of claim 15, wherein the encrypted result received by the third party from the second party includes ciphertext generated using homomorphic addition by the second party on a first ciphertext component generated by the first party for the first data set and a second ciphertext component generated by the second party for the second data set.

17. The computing system of claim 16, wherein the first ciphertext component is generated by the first party using asymmetric additively homomorphic encryption performed using the public key and a first polynomial that evaluates to zero at elements of the data set of the first party, and the second ciphertext component is generated by the second party using the asymmetric additively homomorphic encryption performed using the public key and a second polynomial that evaluates to zero at elements of the data set of the second party.

18. The computing system of claim 15, wherein the intermediate data set is a first intermediate data set corresponding to a numerator and the cryptographic computation engine is further configured to determine the private set difference by
receiving, from the first party, a second intermediate data set corresponding to a denominator computed by the first party,
finding a unique rational function using rational function interpolation based on a ratio of the first intermediate data set to the second intermediate data set,
determining a coprime polynomial numerator and a coprime polynomial denominator based on the unique rational function, and
computing the private set difference based on elements of the first data set and the second data set that result in the coprime polynomial denominator equaling zero.

19. The computing system of claim 15, wherein the encrypted result is homomorphically evaluated from a polynomial for all elements of an encrypted data set by the second party, wherein the encrypted data set is generated by the first party from an asymmetrical homomorphic encryption performed by the first party on the data set of the first party.

20. The computing system of claim 19, wherein the polynomial evaluates to zero for elements of the second data set and to identities of elements that are not elements of the second data set.

* * * * *